(12) United States Patent
de Jong et al.

(10) Patent No.: US 10,304,297 B2
(45) Date of Patent: May 28, 2019

(54) CONNECTIBLE COMPONENT IDENTIFICATION

(71) Applicant: Apple Inc., Cupertino, CA (US)

(72) Inventors: Erik G. de Jong, San Francisco, CA (US); Fletcher R. Rothkopf, Los Altos, CA (US); Trevor J. Ness, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 5 days.

(21) Appl. No.: 15/650,906

(22) Filed: Jul. 15, 2017

(65) Prior Publication Data

US 2017/0316657 A1    Nov. 2, 2017

Related U.S. Application Data

(63) Continuation of application No. 15/023,931, filed as application No. PCT/US2013/062514 on Sep. 29, 2013, now abandoned.

(51) Int. Cl.
| | | |
|---|---|---|
| G08B 5/22 | (2006.01) | |
| G06K 7/14 | (2006.01) | |
| H04M 1/04 | (2006.01) | |

(Continued)

(52) U.S. Cl.
CPC ............. G08B 5/22 (2013.01); A45C 11/00 (2013.01); G06F 1/1628 (2013.01);
(Continued)

(58) Field of Classification Search
CPC ...................................................... G08B 5/22
(Continued)

(56) References Cited

U.S. PATENT DOCUMENTS

| 5,772,466 A | 6/1998 | Morin et al. |
| 2005/0174302 A1* | 8/2005 | Ishii ................ G06F 3/1423 |
| | | 345/30 |

(Continued)

FOREIGN PATENT DOCUMENTS

| CN | 2520111 | 11/2002 |
| CN | 102156510 | 8/2011 |

(Continued)

OTHER PUBLICATIONS

Australia Application No. 2013401921, "Examination Report No. 1", dated Aug. 2, 2016, 3 pages (Continued)

*Primary Examiner* — Qutbuddin Ghulamali
(74) *Attorney, Agent, or Firm* — Kilpatrick Townsend & Stockton LLP

(57) ABSTRACT

A connectible component is connected to a housing. A sensor of the housing is utilized to detect an identity element of the at connectible component. The connectible component is identified utilizing the at least one sensor. In some implementations, identification of the connectible component may identify whether or not a connectible component is connected to the housing. In other implementations, identification of the connectible component may identify the type of connectible component that is connected. In such implementations, the housing may house an electronic device and the electronic device may be configured based on the type of connectible component that is connected.

14 Claims, 8 Drawing Sheets

(51) Int. Cl.
*G06F 1/16* (2006.01)
*A45C 11/00* (2006.01)

(52) U.S. Cl.
CPC ......... *G06F 1/1677* (2013.01); *G06K 7/1413* (2013.01); *H04M 1/04* (2013.01); *A45C 2011/002* (2013.01); *A45C 2011/003* (2013.01)

(58) Field of Classification Search
USPC ........................................................ 340/687
See application file for complete search history.

(56) References Cited

U.S. PATENT DOCUMENTS

| | | | |
|---|---|---|---|
| 2012/0068919 | A1 | 3/2012 | Lauder et al. |
| 2012/0183262 | A1 | 7/2012 | Schwandt et al. |
| 2013/0106603 | A1 | 5/2013 | Lauder et al. |
| 2013/0333418 | A1* | 12/2013 | Anger .................. A44C 5/0069 63/1.11 |
| 2014/0213119 | A1 | 7/2014 | Thackston et al. |
| 2014/0239065 | A1* | 8/2014 | Zhou ....................... G06F 1/163 235/380 |
| 2015/0227245 | A1 | 8/2015 | Inagaki et al. |
| 2016/0029760 | A1 | 2/2016 | Park et al. |

FOREIGN PATENT DOCUMENTS

| | | |
|---|---|---|
| JP | 2007530082 | 11/2007 |
| JP | 2012529719 | 11/2012 |
| KR | 101026868 | 4/2011 |
| KR | 101894164 | 8/2018 |
| WO | WO2012/036711 | 3/2012 |
| WO | WO2013/133810 | 9/2013 |

OTHER PUBLICATIONS

Australia Application 2013401921 , "Examination Report No. 2", dated May 10, 2017, 3 pages.
China Application No. 201380079908.X , "First Office Action", dated Sep. 26, 2016, 19 pages.
Korea Application No. 10-2018-7024441 , "Office Action", dated Oct. 12, 2018, 7 pages.
PCT Application No. PCT/US2013/062514 , "International Search Report and Written Opinion", dated Jul. 10, 2014, 9 pages.
Korean Patent Application No. 2018-7036099, Office Action, dated Feb. 13, 2019, 7 pages.

* cited by examiner

CONNECTIBLE COMPONENT IDENTIFICATION

CROSS-REFERENCE TO RELATED APPLICATION(S)

This application is a continuation patent application of U.S. patent application Ser. No. 15/023,931, filed Mar. 22, 2016 and titled "Connectible Component Identification," which is a 35 U.S.C. § 371 application of PCT Patent Application No. PCT/US2013/062514, filed Sep. 29, 2013 and titled "Connectible Component Identification," the disclosures of which are hereby incorporated herein by reference in their entireties.

TECHNICAL FIELD

This disclosure relates generally to connectible components, and more specifically to identification of connectible components.

BACKGROUND

Many devices include connectible components. For example, sport and health monitors, as well as other devices worn on a user's body, may be connectible to one or more bands. Such bands may be an essential part of such devices in order for them to be secured to a user's wrist or other body part. Such bands may also provide unique styling and comfort for the device.

Various different types of bands may be available for a wearable device including, but not limited to, bands of various types of materials, colors, and styles. Some types, such as tight fitting silicone bands, may be designed for physical activities. Other types, such as metal link bands, may be designed for style and use in social situations.

Given that various different types of bands may be available for a wearable device, quick attachment and detachment mechanisms may be available to enable a user to quickly and easily change between various bands. The user may change between various bands based on the user's activity, mood, or outfit.

SUMMARY

The present disclosure discloses systems and methods for connectible component identification. A connectible component may be connected to a housing. A sensor of the housing may be utilized to detect an identity element of the connectible component. The connectible component may be identified utilizing the at least one sensor.

In some implementations, identification of the connectible component may identify whether or not a connectible component is connected to the housing. In other implementations, identification of the connectible component may identify the type of connectible component that is connected. In such implementations, the housing may house an electronic device and the electronic device may be configured based on the type of connectible component that is connected. In still other implementations, identification of the connectible component may identify a position in which the connectible component is positioned. In such implementations, the housing may house an electronic device and the electronic device may be configured based on the position in which the connectible component is connected.

In some embodiments, a method for connectible component identification may include: connecting at least one connectible component to at least one housing; utilizing at least one sensor of the at least one housing to detect at least one identity element of the at least one connectible component; and identifying the at least one connectible component utilizing the at least one sensor.

In various embodiments, a system for connectible component identification may include: at least one housing; at least one connectible component that is connectible to the at least one housing; at least one identity element coupled to the at least one connectible component; and at least one sensor coupled to the at least one housing that detects the at least one identity element when the at least one connectible component is connected to the at least one housing. The at least one connectible component may be identified based at least on the at least one sensor.

In one or more embodiments, a device may include at least one housing and at least one sensor coupled to the at least one housing that detects at least one identity element of at least one connectible component when the at least one connectible component is connected to the at least one housing. The device may identify the at least one connectible component based at least on the at least one sensor.

In various implementations, the identify element may include one or more magnetic elements and the sensor may include at least one Hall effect sensor. In addition to identification, in some cases such magnetic elements may be utilized as part of a connection mechanism utilized to connect the connectible component to the housing and/or disconnect the connectible component from the housing.

However, in other implementations, the identity element may be an element other than a magnetic element. In some implementations, the identity element may be at least one near field communication transmitter detectable by at least one near field communication receiver, at least one colored indicator detectable by at least one optical detector, at least one bar code detectable by at least one barcode reader, at least one mechanical feature detectable by at least one mechanical feature detector, at least one electrode detectable by at least one contact, at least one infrared emitter detectable by at least one infrared detector, at least one light emitter detectable by at least one light detector, and/or any other such element that can be utilized to identify the connectible component.

In embodiments where the identity element is a number of magnetic elements, the magnetic elements may be separate magnetic elements. Alternatively, the magnetic elements may be individually controllable magnetic surfaces of a larger magnetic element. In such embodiments, the magnetic elements may be configured to encode one or more codes that may be detectable by one or more Hall effect sensors.

In some cases, the connectible component may be connected to the housing by moving the connectible component in a direction toward one or more sensors positioned within the housing. In other cases, the connectible component may be connected to the housing by moving the connectible component in a direction parallel to one or more Hall effect sensors positioned within the housing.

In various implementations, the sensor may be completely enclosed within the housing. In some such implementations, the housing may be waterproof. However, in other implementations the sensor may be at least partially positioned on at least one external surface of the housing.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

Figure 1:
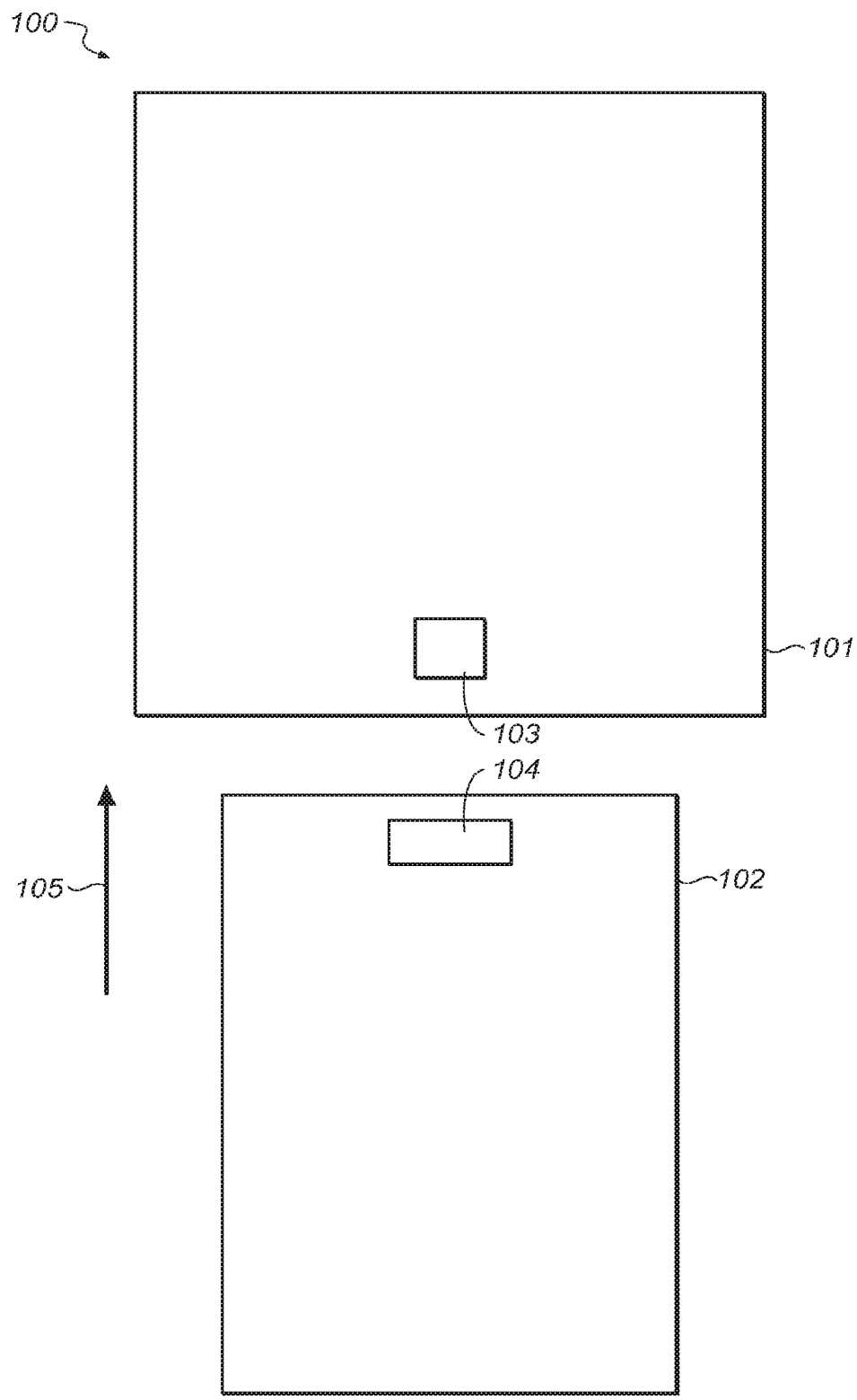
FIG. 1 is a block diagram illustrating a first example system for connectible component identification.

The description that follows includes sample systems, methods, and computer program products that embody various elements of the present disclosure. However, it should be understood that the described disclosure may be practiced in a variety of forms in addition to those described herein.

The present disclosure discloses systems and methods for connectible component identification. A connectible component may be connected to a housing. A sensor of the housing may be utilized to detect an identity element of the connectible component. The connectible component may be identified utilizing the at least one sensor.

In some implementations, identification of the connectible component may identify whether or not a connectible component is connected to the housing.

In other implementations, identification of the connectible component may identify the type of connectible component that is connected. In such implementations, the housing may house an electronic device and the electronic device may be configured based on the type of connectible component that is connected.

In still other implementations, identification of the connectible component may identify a position in which the connectible component is positioned. In such implementations, the housing may house an electronic device and the electronic device may be configured based on the position in which the connectible component is connected.

In some implementations, the connectible component may be one or more watch bands. In such implementations, the housing may comprise one or more watch bodies. However, it is understood that this is an example. In other implementations the connectible component may include any kind of component that may connect to any kind of housing, such as a connector that connects to a mobile computing device, a belt that connects to a buckle, a keyboard that connects to a tablet computing device, and so on.

In various implementations, the identify element may include one or more magnetic elements (such as permanent magnets, electromagnets, and so on) and the sensor may include at least one Hall effect sensor (e.g., a transducer that varies its output voltage in response to a magnetic field). In addition to identification, in some cases such magnetic elements may be utilized as part of a connection mechanism utilized to connect the connectible component to the housing and/or disconnect the connectible component from the housing.

However, in other implementations, the identity element may be an element other than a magnetic element. In some implementations, the identity element may be at least one near field communication transmitter detectable by at least one near field communication receiver, at least one colored indicator detectable by at least one optical detector, at least one bar code detectable by at least one barcode reader, at least one mechanical feature detectable by at least one mechanical feature detector, at least one electrode detectable by at least one contact, at least one infrared emitter detectable by at least one infrared detector, at least one light emitter detectable by at least one light detector, and/or any other such element that can be utilized to identify the connectible component.

In embodiments where the identity element is a number of magnetic elements, the magnetic elements may be separate magnetic elements. Alternatively, the magnetic elements may be individually controllable magnetic surfaces of a larger magnetic element. In such embodiments, the magnetic elements may be configured to encode one or more codes that may be detectable by one or more Hall effect sensors.

In some cases, the connectible component may be connected to the housing by moving the connectible component in a direction toward one or more Hall effect sensors positioned within the housing. In such cases, multiple Hall effect sensors may be utilized that each detect one of the magnetic elements and thereby cooperatively detect a code encoded therein that may be utilized to identify the connectible component.

In other cases, the connectible component may be connected to the housing by moving the connectible component in a direction parallel to one or more Hall effect sensors positioned within the housing. For example, a Hall effect sensor may be positioned at a corner of the housing and may detect each of the magnetic elements (and thereby detect a code encoded therein that may be utilized to identify the connectible component) as the connectible component is moved parallel to the Hall effect sensor while connecting the connectible component.

By way of another example, Hall effect sensors may be positioned at opposite corners of the housing. In such an example, the connectible component may be connected by moving the connectible component from a corner where either one of the two Hall effect sensors is located in a direction parallel to that Hall effect sensor toward the other Hall effect sensor. As such, that Hall effect sensor may each detect each of the magnetic elements, and thereby detect a code encoded therein that may be utilized to identify the connectible component.

In various implementations, the sensor may be completely enclosed within the housing. In some such implementations, the housing may be waterproof. However, in other implementations the sensor may be at least partially positioned on at least one external surface of the housing.

FIG. 1 is a block diagram illustrating a first example system 100 for connectible component identification. As illustrated, the system may include a housing 101 and a connectible component 102 that may be connected to the housing. In this example, the connectible component may be connected to the housing by moving the connectible component in a direction 105 toward the housing.

As illustrated, the housing 101 is a watch body and the connectible component is a watch band 102. However, it is understood that this is an example. In various implementations, the housing may be an item other than a watch body (such as a laptop computing device, a desktop computing device, a mobile computing device, a tablet computing device, a smart phone, a cellular telephone, a digital media player, a buckle, a wearable device, and/or any other such item) and the connectible component may be any component that is connectible thereto (such as a connector, a keyboard, a cover, an external device, and/or any other such connectible component).

The housing 101 may include one or more sensors 103. Further, the connectible component 102 may include one or more identity elements 104. When the connectible component is connected to the housing, the sensor may detect the identity element. Based at least on the detection of the identity element, the connectible component may be identified.

For example, the identity element 104 may be one or more magnetic elements (such as one or more permanent magnets, electromagnets, and so on). In this example, the sensor 103 may be one or more Hall effect sensors. When the connectible component 102 is connected to the housing 101, the Hall effect sensor may detect the magnetic element.

In some cases, the sensor 103 may identify the connectible component 102 by detecting whether or not a connectible component is connected. As such, when the sensor is a Hall effect sensor and the identify element 104 is a magnetic element, the Hall effect sensor detecting the magnetic element may identify that a connectible component of some type is connected.

In cases where the housing 101 houses an electronic device, the electronic device may configure itself in one manner when a connectible component 102 is connected and in another manner when a connectible component is not connected. For example, an electronic device may display a "Connectible Component Connected" icon on a screen when a connectible component is connected and a "Connectible Component Not Connected" icon on the screen when a connectible component is not connected.

In other cases, the sensor 103 may identify the connectible component 102 by detecting one or more codes encoded by the identity element 104. In the present example, the identity element may be a single magnetic element. However, even a single magnetic element may encode codes corresponding to multiple types of bands. For example, the magnetic element may be configured to present a positively (e.g., + or "north") polarized surface for a "business use" type connectible component, a negatively (e.g., − or "south") polarized surface for a "home use" type connectible component, and a combination of the positively polarized surface and the negatively polarized surface for a "sport use" type connectible component. As such, whether the connectible component is a business use, home use, or sport use may be identified based on the polarity of the surface detected by the Hall effect sensor.

In cases where an electronic device is housed within the housing 101, the electronic device may configure itself in one manner when a first type of connectible component 102 is connected and in another manner when a second type of connectible component is connected. For example, in implementations where the electronic device is a watch, the electronic device may display a time in a 24-hour time format and a calculator application when a business use type connectible component is attached, a time in a 12-hour format when a home use type connectible component is attached, and a stopwatch application when a sport use type connectible component is attached. When the type of connectible component detected switches, the electronic device may reconfigure itself accordingly.

In still another example, a tablet computing device may be housed within the housing 101 and connectible components 102 of a keyboard or a cover type may be connected. In such a case, the tablet computing device may configure itself to display a word processing application when the keyboard connectible component type is connected and to put itself into a power hibernation state when the cover connectible component type is connected.

The connectible component 102 may be connected to the housing 101 via a variety of different connection mechanisms that are not shown. For example, the connectible component and/or the housing may include one or more magnetic hard (permanent magnets) or soft (materials such as ferrous metals that are not magnetic but can become so in response to the proximity of magnetized elements) that may magnetically attach to connect the connectible component and the housing when brought together in the direction 105 and/or detach to disconnect the connectible component and the housing (such as by pressing a button that reverses polarity of magnets to repulse the connectible component from the housing). By way of another example, the connectible component and/or the housing may include one or more mechanical attachment mechanisms such as retractable pins and apertures into which the retractable pins may insert.

Regardless of the type of connection mechanism utilized, in some cases the identity element 104 may be part of the connection mechanism. For example, in implementations where a magnetic connection mechanism is utilized and the identity element is at least one magnetic element, the identity element may be operable to magnetically attach to a hard and/or soft magnetic element of the housing 101. In cases where a mechanical connection mechanism is utilized and the identity element is a magnetic element, the magnetic element may assist in positioning the connectible element 102 with respect to the housing 101 for purposes of engaging the mechanical connection.

Figure 2:
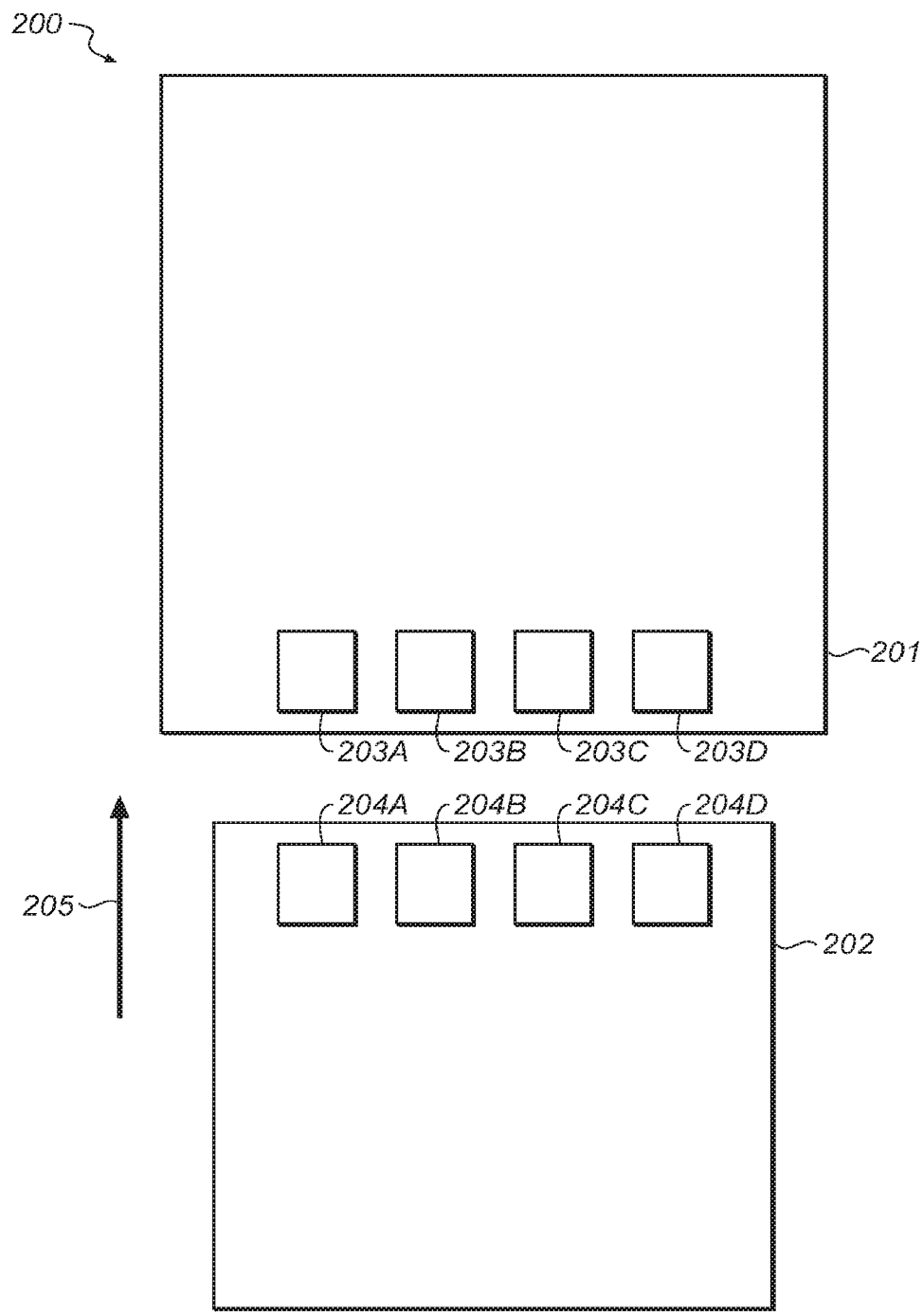
FIG. 2 is a block diagram illustrating a second example system for connectible component identification.

FIG. 2 is a block diagram illustrating a second example system 200 for connectible component identification. To contrast this example with that of FIG. 1, the sensor in this example is a plurality of sensors 203A-203D and the identity element is a plurality of identity elements 204A-204D. In this example, when the connectible element 202 is brought toward the housing 201 in the direction 205, the plurality of sensors each detect a respective one of the plurality of identity elements. In this way, the arrangement of the plurality of identity elements encode one or more codes that can represent a type of the connectible component.

For example, the plurality of identity elements 204A-204D may be magnetic elements and the plurality of sensors 203A-203D may be a plurality of Hall effect sensors. In such an example, the plurality of identity elements may represent different connectible component 202 types based on the polarities of the plurality of identity elements that face the plurality of Hall effect sensors. A polarity pattern of "++++" may represent a first type of band and a polarity pattern of "−−−−" may represent a second type of band. Additionally, a pattern of "+−+−" may represent a third type of band, a pattern of "−+−−" may represent a fourth type of band, and so on, where + denotes a positive polarity and − a negative polarity.

Additionally, though the examples above describe one polarity or the other facing a Hall effect sensor, it is understood that this is an example. In various cases, one or more portions of each polarity may face and be detected by the Hall effect sensor.

Figure 3:
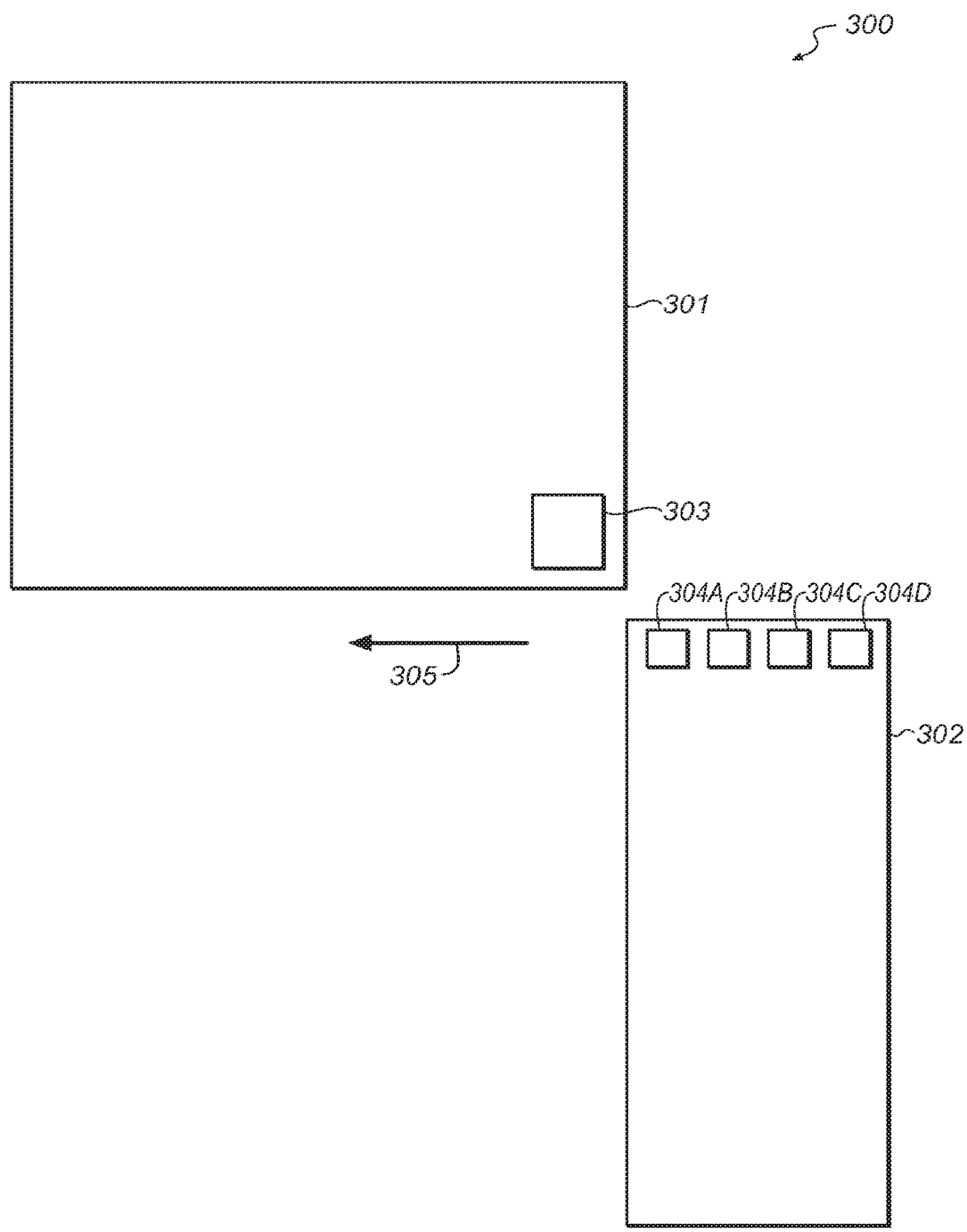
FIG. 3 is a block diagram illustrating a third example system for connectible component identification.

FIG. 3 is a block diagram illustrating a third example system 300 for connectible component identification. To contrast this example with that of FIG. 2, the sensor in this example is a single sensor 303 positioned at a corner of the housing 301 and the connectible element 302 connects to the housing by moving in a direction 305 parallel to the sensor from the corner of the housing where the sensor is located to the opposite corner along the direction 305. As the connectible element is connecting to the housing, the various identity elements 304A-304D may pass sequentially by (and be detected by) the sensor 303 along the direction 305. As such, the identity elements may be configured to encode a code representing a type of connectible element and may be detectable by a single sensor during connection.

The connectible component 302 may be connected to the housing 301 via a variety of different connection mechanisms that are not shown. For example, the connectible component and/or the housing may include one or more rods that are inserted into one or more tubes in order to connect the connectible component to the housing (and/or removed from the tubes in order to disconnect the connectible component from the housing).

Figure 4:
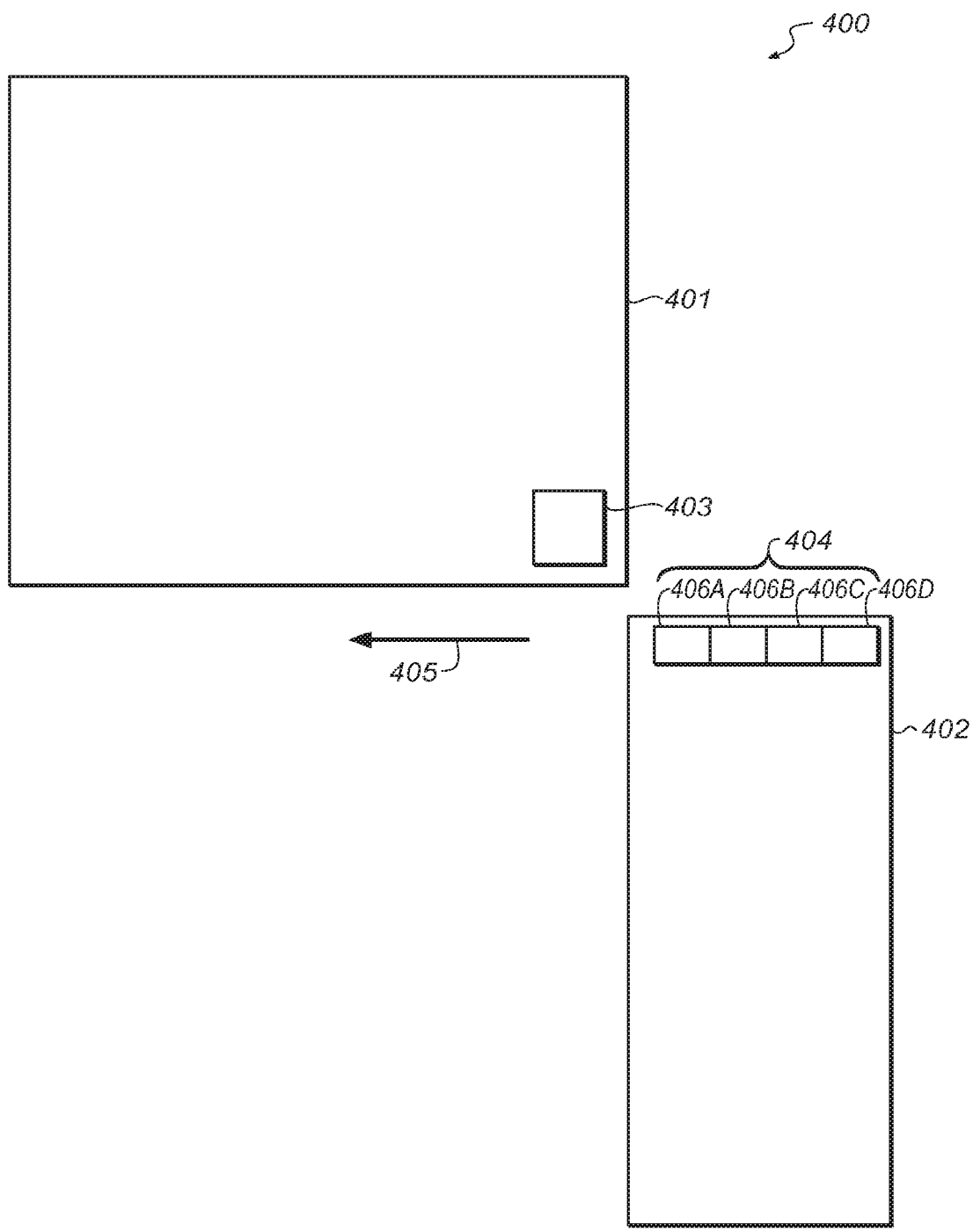
FIG. 4 is a block diagram illustrating a fourth example system for connectible component identification.

FIG. 4 is a block diagram illustrating a fourth example system 400 for connectible component identification. To contrast this example with that of FIG. 3, the identity elements 406A-D may be individually controllable surfaces of a combined identity element 4 as opposed to the separate and separated identity elements 303A-D of FIG. 3. In implementations where the identity elements 406A-D are magnetic elements, the identity elements 406A-D may be individually controllable magnetic elements.

Figure 5:
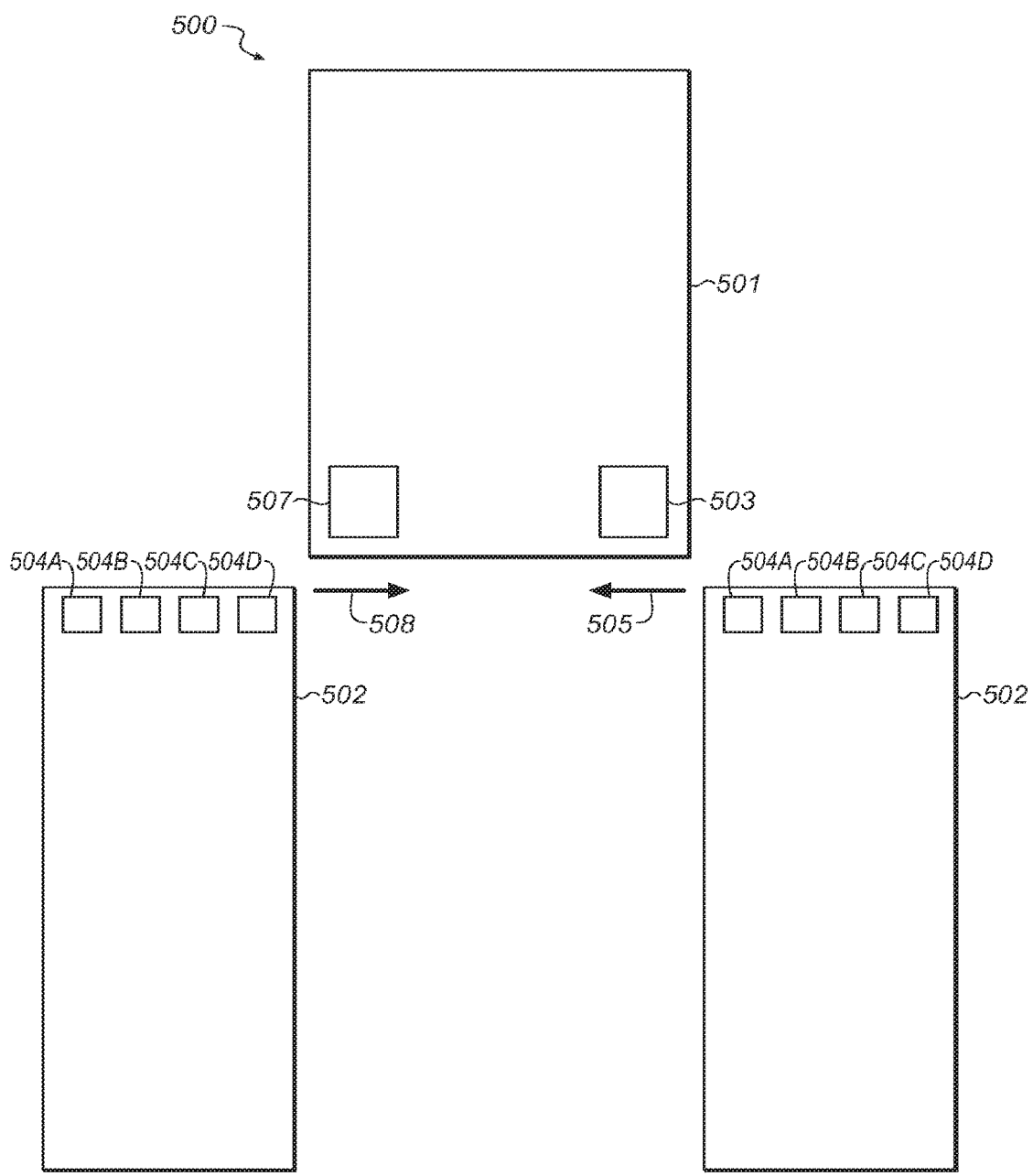
FIG. 5 is a block diagram illustrating a fifth example system for connectible component identification.

FIG. 5 is a block diagram illustrating a fifth example system 500 for connectible component identification. To contrast this example with that of FIG. 3, an additional sensor 507 may be located at an opposite corner from the sensor 503. Further, in this example, the connectible component 502 may be connected to the housing by either moving the connectible element in the direction 505 from the corner where the sensor 503 is located to the corner where the sensor 507 is located or by moving the connectible element in the direction 508 from the corner where the sensor 507 is located to the corner where the sensor 503 is located. In this way, the connectible component could be connected from either side and the connectible component may still be identified.

In some cases, the detection performed by the sensors 503 and 507 may be handled differently as the sensors 503 and 507 would encounter the identity elements 504A-504D in a different order when the connectible component 502 is connected to the housing 501. In some cases, the codes encoded by the identity elements may be the same forwards and backwards so that analysis of sensor detection may be the same for both the sensor 503 and 507. For example, in a case where the identity elements were magnetic elements, patterns of "++−−" and "−−++" may both indicate a business use connectible element whereas patterns of "−+−+" and "+−+−" may both indicate a home use connectible element.

However, in other cases, the sensor detection performed by the sensor 503 may be analyzed opposite from that of the sensor 507 in order to enable the identity elements to encode a greater number of codes. For example, in a case where the identity elements were magnetic elements, a pattern of "++−−" may indicate a business use connectible element when detected by the sensor 503 though the pattern "++−−" may indicate a home use connectible element when detected by the sensor 507. Further, a pattern of "−−++" may indicate a home use connectible element when detected by the sensor 503 though the pattern "−−++" may indicate a business use connectible element when detected by the sensor 507.

Additionally, though the above discussion of FIGS. 1-5 discusses identifying connectible components as either present/not present or a type such as business use, home use, and/or sport use, is it understood that these are examples. Other connectible component types may be identified and an electronic device housed by a connected housing may be altered accordingly. For example, a connectible component may be identified as manufactured by the same manufacturer as the electronic device or a third party. Accordingly, the electronic device may enable certain extra features (such as an office program) when the manufacturer's connectible component is connected and disable those features when the third party component is connected in order to reward brand loyalty.

By way of another example, connectible components may be of a type that indicates a power mode or set of power modes for an electronic device housed by the housing, communications settings to utilize for an electronic device housed by the housing, a user for which an electronic device housed by the housing is to be configured, and/or a variety of different indications. Essentially, identifying the connectible component may identify one or more items of any kind of information signified by a type of the connectible component and an electronic device housed by the housing may perform any kind of configuration or modification based on that information. Such configuration or modification in response to the information may be user configured in some cases such that a user may be able to specify configurations, modifications, and/or alteration of one or more user preferences that are to be performed when a particular connectible component is connected. Regardless, the examples given herein are examples and are not intended to be limiting.

For example, a computing device may be housed within the housing. When the indication indicates that a metallic connectible component is attached, the computing device may configure itself to present metallic icons (and/or a theme of a user interface, and so on). Similarly, when a band of a particular color is attached, the computing device may configure itself to present icons of the particular color (and/or a background color of the particular color, and so on). Or, as another example, when a silicone band is attached, the computing device may configure itself to present one or more sporting application related icons on a "home" screen and/or make such applications available for execution.

Further, though the above discussion of FIGS. 1-5 discusses embodiments where the identify elements are magnetic elements that encode codes by configuring a surface of a magnetic element facing a Hall effect sensor as having a positive or negative polarity, it is understood that this is an example. Such magnetic elements may be configured to have either single polarity surface or a particular orientation of both polarity surfaces without departing from the scope of the present disclosure. Further, such magnetic elements may be configured with a particular strength of a magnetic field such that information is encoded in whether the field is strong or weak; strong, medium, or weak; various degrees of strength; and so on. Additionally, some magnetic elements may be configured to have no magnetic field (or a "null") and may encode information through the lack of a magnetic field. Additionally, in some cases (such as where one or more of the magnetic elements are electromagnets) the magnetic field of magnetic elements may change over time in order to present a pattern, pulse one or more codes, and/or perform other such functions by varying magnetic field.

Additionally, the various sensors and identity elements illustrated in FIGS. 1-5 are illustrated as enclosed within the various housings or connectible components of FIGS. 1-5, respectively. As illustrated, the housings and/or connectible elements may protect the various sensors and identity elements from the external environment while the various sensors are still able to detect the various identity elements. In some cases, the housings and/or connectible elements may be waterproof, hermetically sealed, and so on, thus further protecting the various sensors and identity elements.

However, it is understood that these are examples. In various implementations, the various sensors and/or identity elements may be partially exposed and/or fully external to the various housings and/or connectible elements without departing from the scope of the present disclosure. In some implementations, sensors and/or identity elements may be of types that the sensors are not able to detect the identity elements if separated by a housing and/or identity element.

Moreover, in addition to the presence or absence of a connectible component and a type of a connected connectible component, a connected component may be moveable between multiple positions and identifying a connectible component may include identifying in which position a connectible component is connected.

Figure 6A:
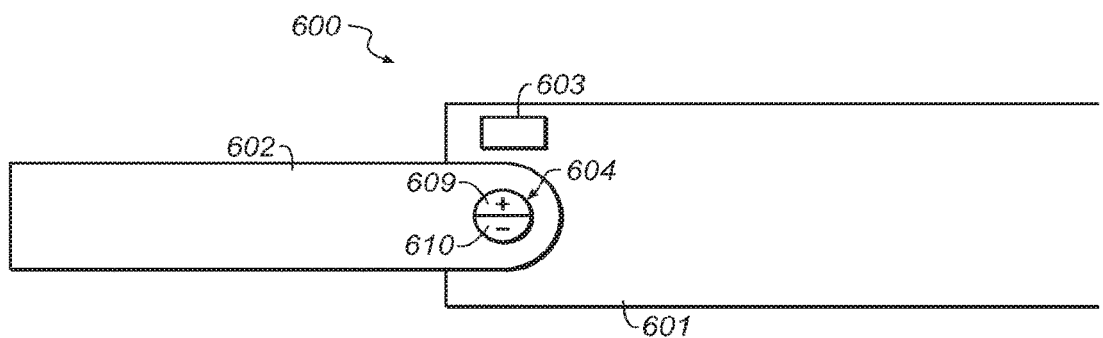
FIG. 6A is a block diagram illustrating a sixth example system for connectible component identification showing the connectible component in a first connected position.

For example, FIG. 6A is a block diagram illustrating a sixth example system 600 for connectible component identification showing the connectible component 602 in a first connected position with respect to the housing 601. In this first position, the sensor 603 may be able to detect an orientation of the identity element 604 to determine that the connectible component is in the first position.

Figure 6B:
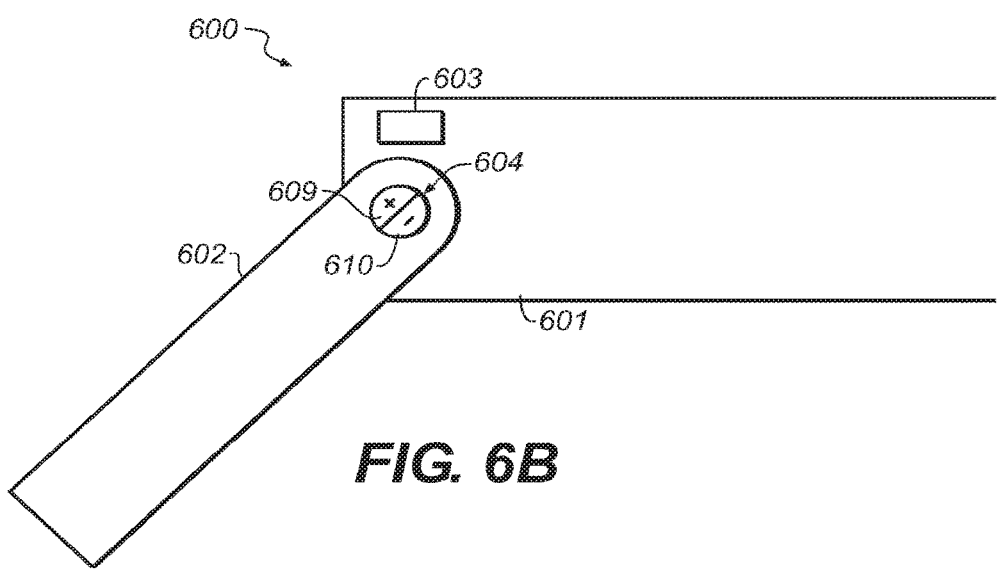
FIG. 6B illustrates the system of FIG. 6A showing the connectible component in a second connected position.

FIG. 6B illustrates the system of FIG. 6A showing the connectible component 602 in a second connected position with respect to the housing 601. As illustrated, movement of the connectible component from the first position to the second position rotates the identity element 604. The sensor 603 may detect the change in the orientation of the identity element to determine that the connectible component is in the second position.

The housing 601 and/or an electronic device housed therein may alter based on whether the connectible component is in the first position or the second position (and/or additional positions in other embodiments). For example, the housing may be a housing for a watch with a display. The connectible component 602 may be in the first position when the watch is "unworn" and in the second position when the watch is "worn." As such, the watch may shift into a "low power mode" when the watch is unworn by dimming the display under the assumption that a user is not needing to view the time. Conversely, the watch may shift into a "normal power mode" when the watch is worn by brightening the display under the assumption that the user may need to view the time when wearing the watch.

As illustrated, the identity element 604 in this embodiment is a magnetic element that is oriented in the first position to present a positive polarity surface to a Hall effect sensor 603 in the first position and a combination of positive and negative polarity surfaces in the second position. However it is understood that this is an example. In other implementations the identity element may be a variety of different kinds of identity elements and/or the sensor may be a variety of different kind of sensors operable to detect orientation of the identity elements without departing from the scope of the present disclosure.

Figure 7:
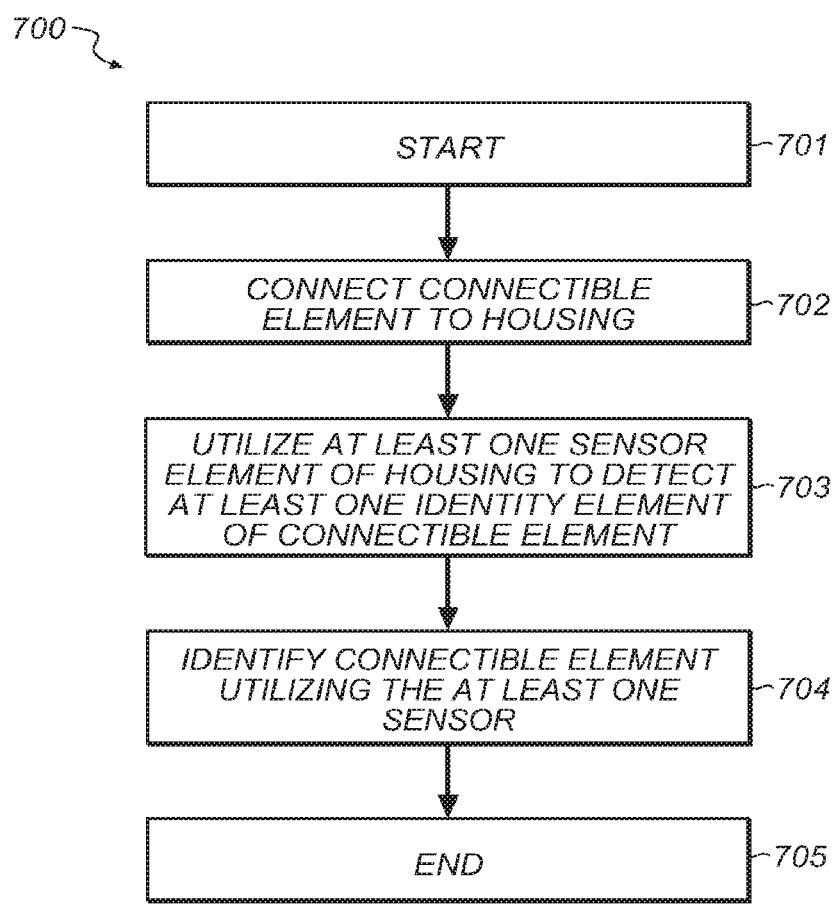
FIG. 7 is a method diagram illustrating a method for connectible component identification. This method may be performed by the systems of FIGS. 1-6B.

FIG. 7 is a method diagram illustrating a method for connectible component identification. This method may be performed by the systems of FIGS. 1-6B.

The flow begins at block 701 and proceeds to block 702 where a connectible element is connected to a housing. The flow then proceeds to block 703 where at least one sensor of the housing is utilized to detect at least one identity element of the connectible element. The flow then proceeds to block 704.

At block 704, the connectible element is identified utilizing the at least one sensor. The identification may be at least partially based on the sensors detection of the identity element. The flow then proceeds to block 705 and ends.

Figure 8:
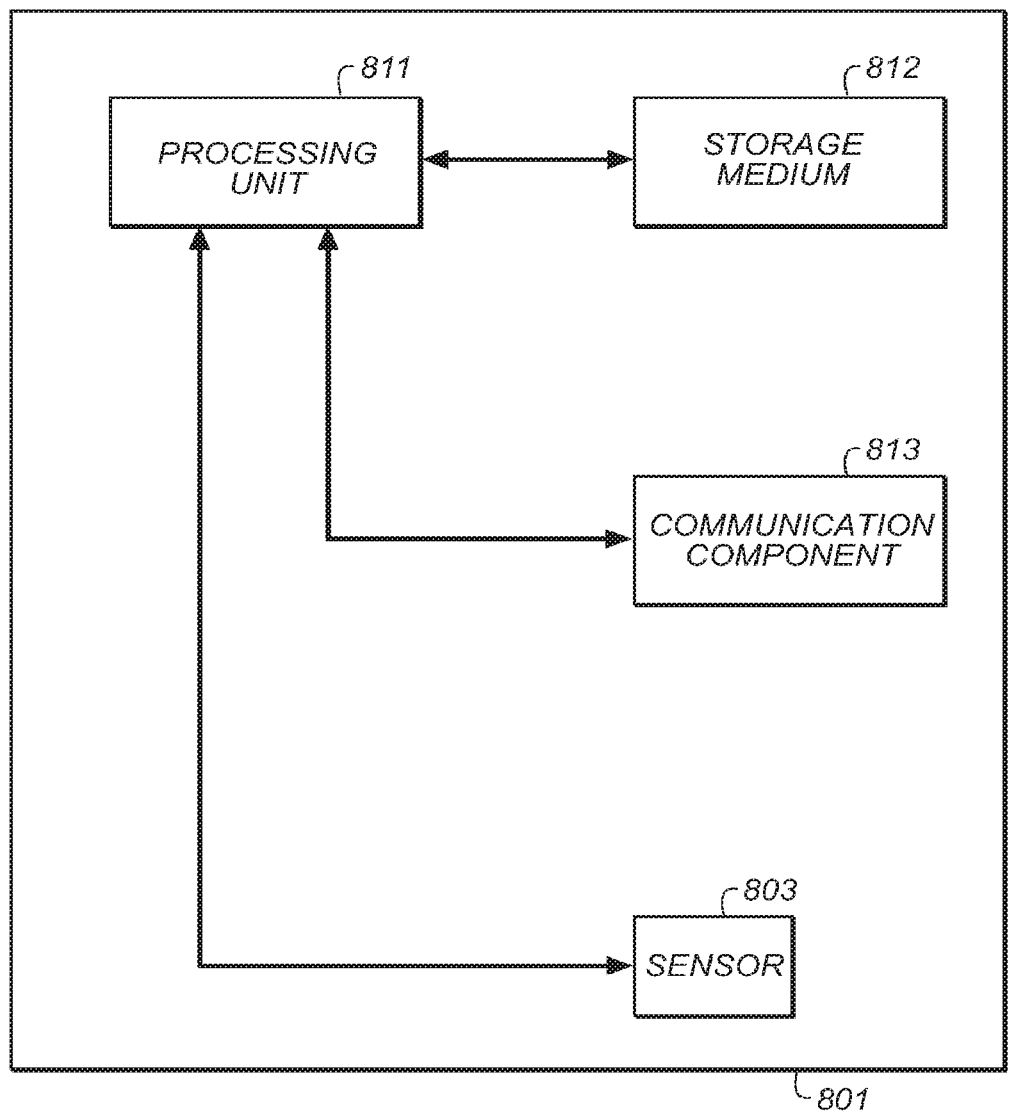
FIG. 8 is a block diagram of an electronic device that may be housed within the housings of FIGS. 1-6B.

FIG. 8 is a block diagram of an electronic device 801 that may be housed within the housings of FIGS. 1-6B. The electronic device may be any kind of electronic device and may include one or more processing units 811, one or more communication components 813 (which may be any kind of communication component such as a WiFi communication component, a Bluetooth communication component, an Ethernet communication component, a satellite communication component, a cellular communication component, and so on), one or more sensors 803 (which may be any kind of sensors), and/or one or more non-transitory storage media 812 (which may take the form of, but is not limited to, a magnetic storage medium; optical storage medium; magneto-optical storage medium; read only memory; random access memory; erasable programmable memory; flash memory; and so on).

Additionally, the electronic device 801 may include one or more other components other than those shown. In some embodiments, the processing unit 811 may execute one or more instructions stored in the non-transitory storage medium 812 to perform one or more electronic device functions. Such functions may include functions such as those described above and illustrated in FIG. 7.

As discussed above and illustrated in the accompanying figures, the present disclosure discloses systems and methods for connectible component identification. A connectible component may be connected to a housing. A sensor of the housing may be utilized to detect an identity element of the connectible component. The connectible component may be identified utilizing the at least one sensor.

In some implementations, identification of the connectible component may identify whether or not a connectible component is connected to the housing. In other implementations, identification of the connectible component may identify the type of connectible component that is connected. In such implementations, the housing may house an electronic device and the electronic device may be configured based on the type of connectible component that is connected. In still other implementations, identification of the connectible component may identify a position in which the connectible component is positioned. In such implementations, the housing may house an electronic device and the electronic device may be configured based on the position in which the connectible component is connected.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. An electronic watch, comprising:
a watch body that is operable to connect to a watch band of a group of different watch bands that each include a respective identity element defined by one or more codes;
a sensor, coupled to the watch body, that is operable to detect the respective one or more codes defined by the corresponding identity element of each watch band of the group of different watch bands, wherein the one or more codes of the identity element is unique to the watch band; and
a processing unit, coupled to the sensor, that is operable to receive the detected one or more codes of the identity element and determine which watch band of the group of different watch bands is connected to the watch body based on the respective one or more codes of the identity element.

2. The electronic watch of claim 1, wherein the processing unit is configured to determine a band type for a connected watch band using the respective identity element.

3. The electronic watch of claim 2, wherein the band type is a business-use type and the processing unit switches the electronic watch to a business use mode when the connected watch band of the group of different watch bands is connected.

4. The electronic watch of claim 2, wherein the band type is a home-use type and the processing unit switches the electronic watch to a home use mode when the connected watch band of the group of different watch bands is connected.

5. The electronic watch of claim 2, wherein the band type is a sport use type and the processing unit switches the electronic watch to a sport-use mode when the connected watch band of the group of different watch bands is connected.

6. The electronic watch of claim 1, wherein the sensor comprises a magnetic sensor.

7. The electronic watch of claim 1, wherein the sensor comprises an electrical contact.

8. A wearable device, comprising:
a housing operable to connect:
to a first band that is configured to attach the housing to a body part of a user; and
to a second band that is configured to attach the housing to the body part of the user; wherein:
the first band includes a first identity element defined by one or more first codes; and
the second band includes a second identity element defined by one or more second codes;
a sensor coupled to the housing and operable to detect the one or more first codes and the one or more second codes defined by the first and second identity elements of the respective first and second bands, wherein the one or more first codes of the first identity element is unique to the first band, and the one or more first codes of the second identity element is unique to the second band; and
a processing unit that is coupled to the sensor is operable to receive the detected one or more first and second codes of the first and second identity element and determine if the first band is connected to the housing or the second band is connected to the housing based on the respective one or more first and second codes of the first and second identity elements.

9. The wearable device of claim 8, further comprising a connection mechanism operable to connect the housing to the first band and the second band.

10. The wearable device of claim 8, wherein the processing unit displays different information on a display when the sensor detects the first identity element than when the sensor detects the second identity element.

11. The wearable device of claim 8, wherein the sensor comprises an optical sensor.

12. The wearable device of claim 8, wherein the sensor comprises a communication receiver.

13. The wearable device of claim 8, wherein:
the processing unit alters operation of the wearable device in a first way when the sensor detects the first identity element; and
the processing unit alters operation of the wearable device in a second way when the sensor detects the second identity element.

14. The wearable device of claim 8, wherein the processing unit determines that the housing is unconnected to a band or is connected to an unknown band when the sensor does not detect an identity element.

* * * * *

UNITED STATES PATENT AND TRADEMARK OFFICE
CERTIFICATE OF CORRECTION

PATENT NO. : 10,304,297 B2
APPLICATION NO. : 15/650906
DATED : May 28, 2019
INVENTOR(S) : Erik G. de Jong et al.

Page 1 of 1

It is certified that error appears in the above-identified patent and that said Letters Patent is hereby corrected as shown below:

In the Claims

Claim 5, Line 11, Column 12, delete "sport-use" and insert --sport use--.

Signed and Sealed this
Sixth Day of August, 2019

Andrei Iancu
*Director of the United States Patent and Trademark Office*